Feb. 6, 1934.  E. R. SMITH  1,945,662
LOADING AND UNLOADING MECHANISM FOR MACHINE TOOLS
Filed Aug. 3, 1931  4 Sheets-Sheet 1

Inventor
Edwin R. Smith
By Attorneys
Southgate Hay & Hawley

Inventor-
Edwin R. Smith
By Attorneys
Southgate Hay & Hawley

Feb. 6, 1934.  E. R. SMITH  1,945,662
LOADING AND UNLOADING MECHANISM FOR MACHINE TOOLS
Filed Aug. 3, 1931  4 Sheets-Sheet 3
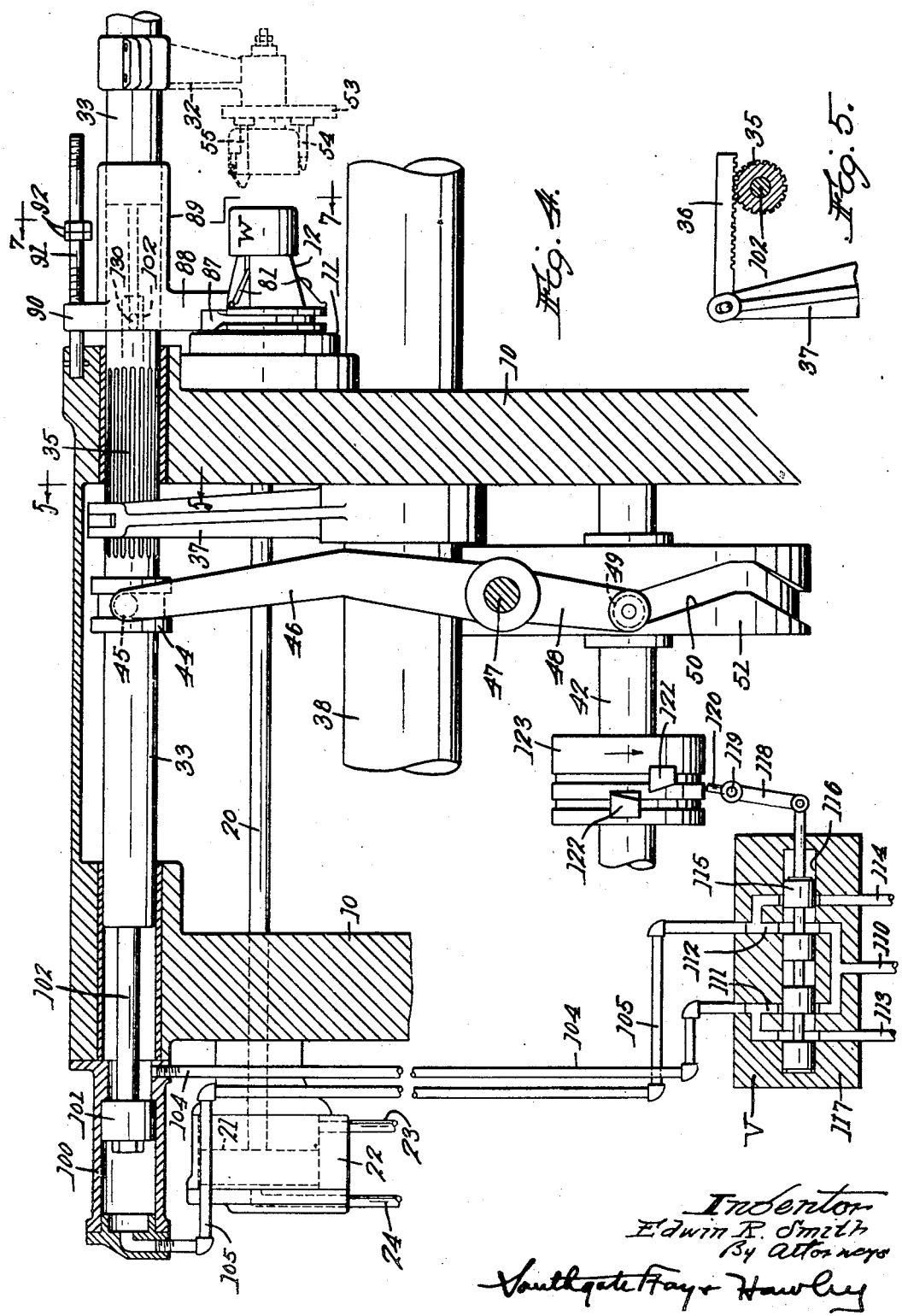

Feb. 6, 1934.  E. R. SMITH  1,945,662
LOADING AND UNLOADING MECHANISM FOR MACHINE TOOLS
Filed Aug. 3, 1931  4 Sheets-Sheet 4
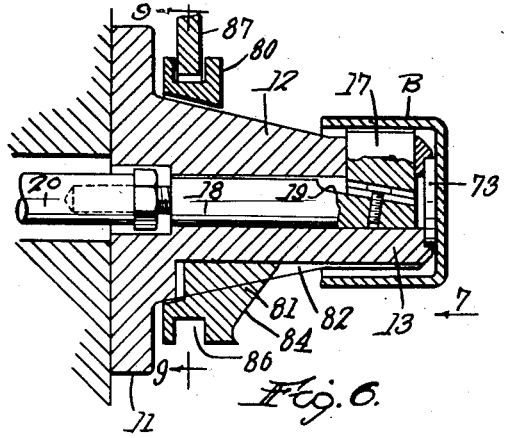
Fig. 6.
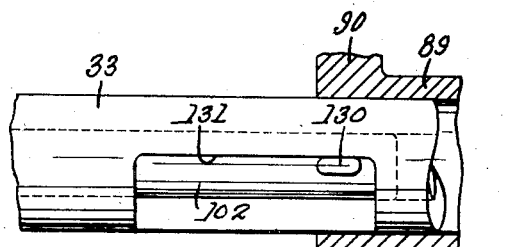
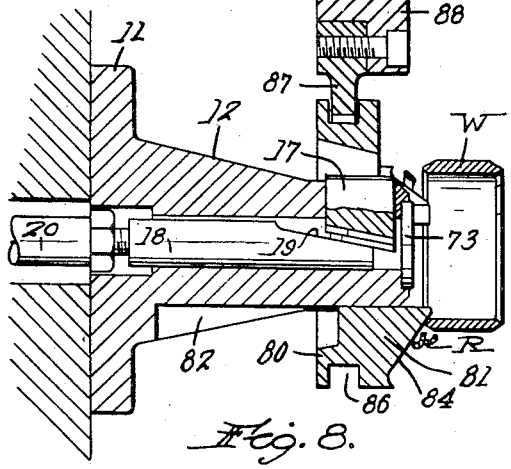
Fig. 8.
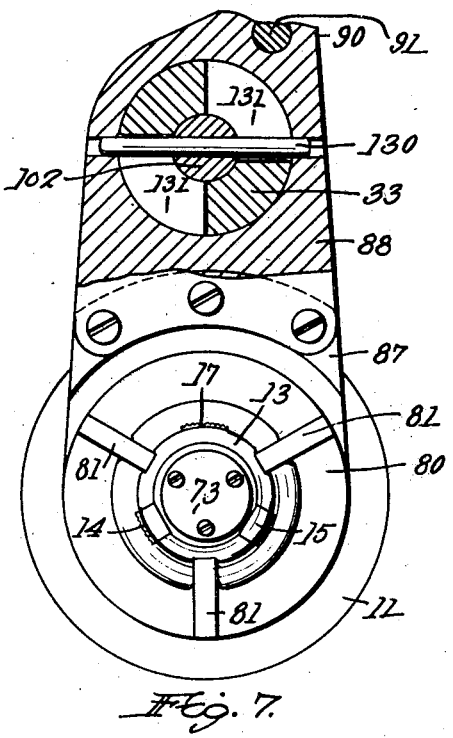
Fig. 7.
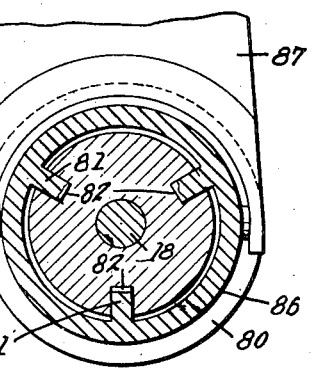
Fig. 9.
Inventor
Edwin R. Smith
By Attorneys
Southgate Faye Hawley Patented Feb. 6, 1934

1,945,662

UNITED STATES PATENT OFFICE 1,945,662

LOADING AND UNLOADING MECHANISM FOR MACHINE TOOLS

Edwin R. Smith, Seneca Falls, N. Y., assignor to Seneca Falls Machine Company, Seneca Falls, N. Y., a corporation of Massachusetts Application August 3, 1931. Serial No. 554,718

9 Claims. (Cl. 82—2)

This invention relates to lathes or other machine tools in which provision is made for automatic removal and replacement of finished work.

It is one object of my invention to provide improved means for removing a blank from storage and placing it upon a chuck or work holder.

A further object is to provide an improved device for removing finished work from the work driving spindle.

I also provide actuating mechanism by which the loading and unloading may be performed in timed relation to the finishing operations.

My invention further relates to arrangements and combinations of parts which will be hereinafter described and more particularly pointed out in the appended claims.

A preferred form of the invention is shown in the drawings, in which

Fig. 1 is an end elevation, partly in section, showing portions of an automatic lathe having my improvements embodied therein;

Figs. 2 and 3 are partial plan views, looking in the direction of the arrows 2 and 3 in Fig. 1;

Fig. 4 is a sectional side elevation, taken along the line 4—4 in Fig. 1 and showing the operating mechanism;

Fig. 5 is a detail sectional elevation, taken along the line 5—5 in Fig. 4;

Fig. 6 is a sectional side elevation of the unloading device;

Fig. 7 is an end elevation of the unloading device, with the actuating mechanism shown in section along the line 7—7 in Fig. 4;

Fig. 8 is a view similar to Fig. 6 but showing the parts in a different position, and Fig. 9 is a detail sectional view, taken along the line 9—9 in Fig. 6.

Figure 1:
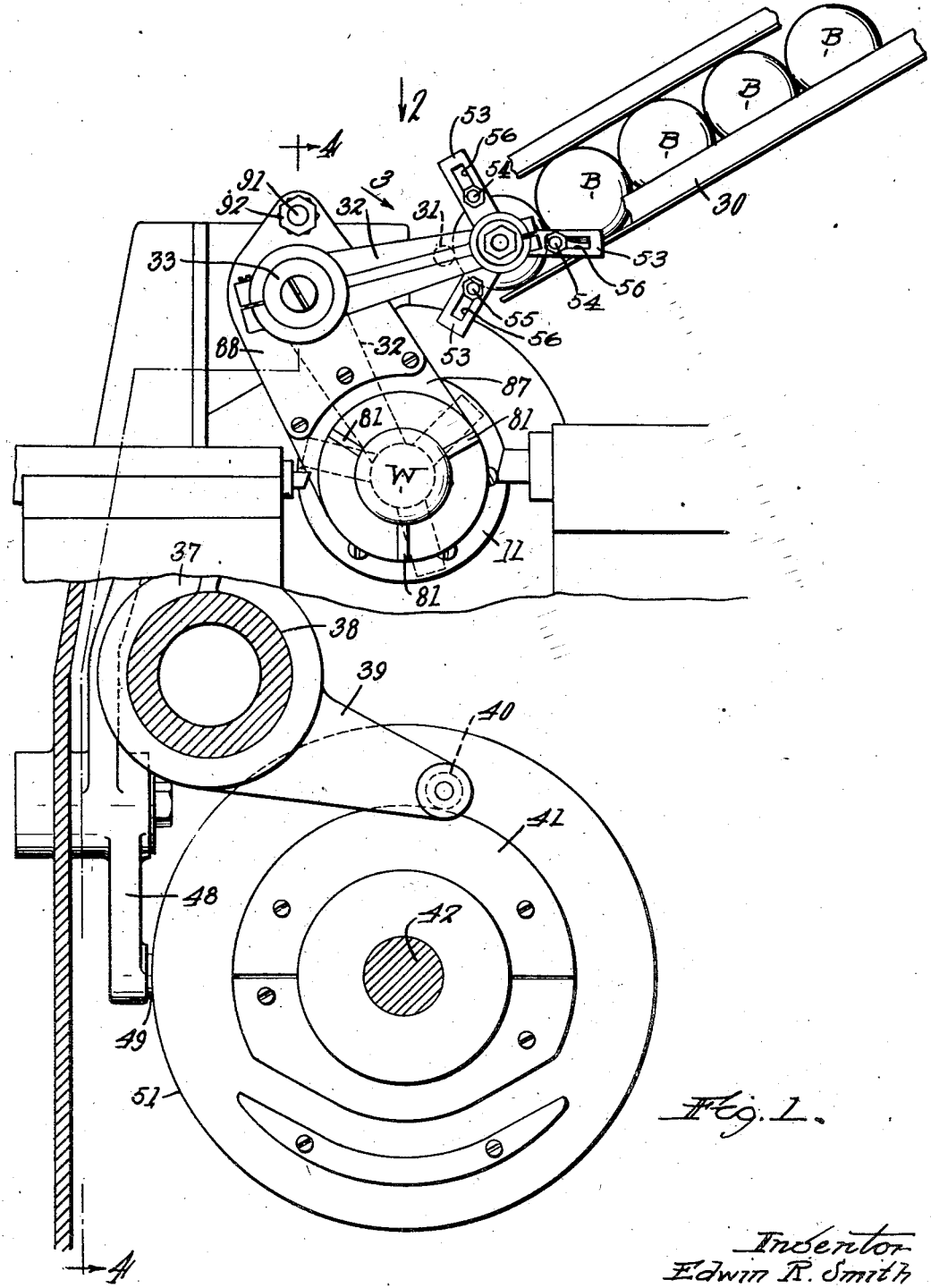

Referring to Fig. 4, I have shown portions of an automatic lathe including a frame 10 on which a chuck or work holder 11 is supported and rotated by suitable driving mechanism, not shown.

The work holder may be of any suitable form but is shown herein as comprising a conical extension 12 (Fig. 8) terminating in a cylindrical portion 13 on which work-engaging members 14 and 15 (Fig. 7) are mounted in fixed relation to the part 13.

A third work-engaging member 17 is mounted for radial sliding movement in the portion 13 and may be forced outwardly by a plunger 18 (Fig. 8) having a wedge-shaped end portion 19 engaging the member 17. The plunger 18 is secured to the end of a piston rod 20 (Fig. 4) extending through the frame to a piston 21 slidable in a cylinder 22 and connected by pipes 23 and 24 to a suitable oil supply.

When pressure is admitted through the pipe 24, the piston 21 is advanced to insert the wedge 19 under the member 17, forcing the same outward to engage and grip the work W. Pressure applied through the pipe 23 will cause the wedge 19 to be withdrawn, thus releasing the work. It will be understood that whenever pressure is applied through one of the pipes 23 or 24, the other pipe is connected to the exhaust.

Work loading mechanism

I will now describe my improved mechanism for removing a blank from storage and placing it upon the work holder or chuck.

I first provide a runway or storage device 30 (Fig. 1) on which a plurality of cup-shaped blanks B or other articles may be stored. These blanks feed downward by gravity until they engage a stop pin 31 (Fig. 2).

Figure 2:
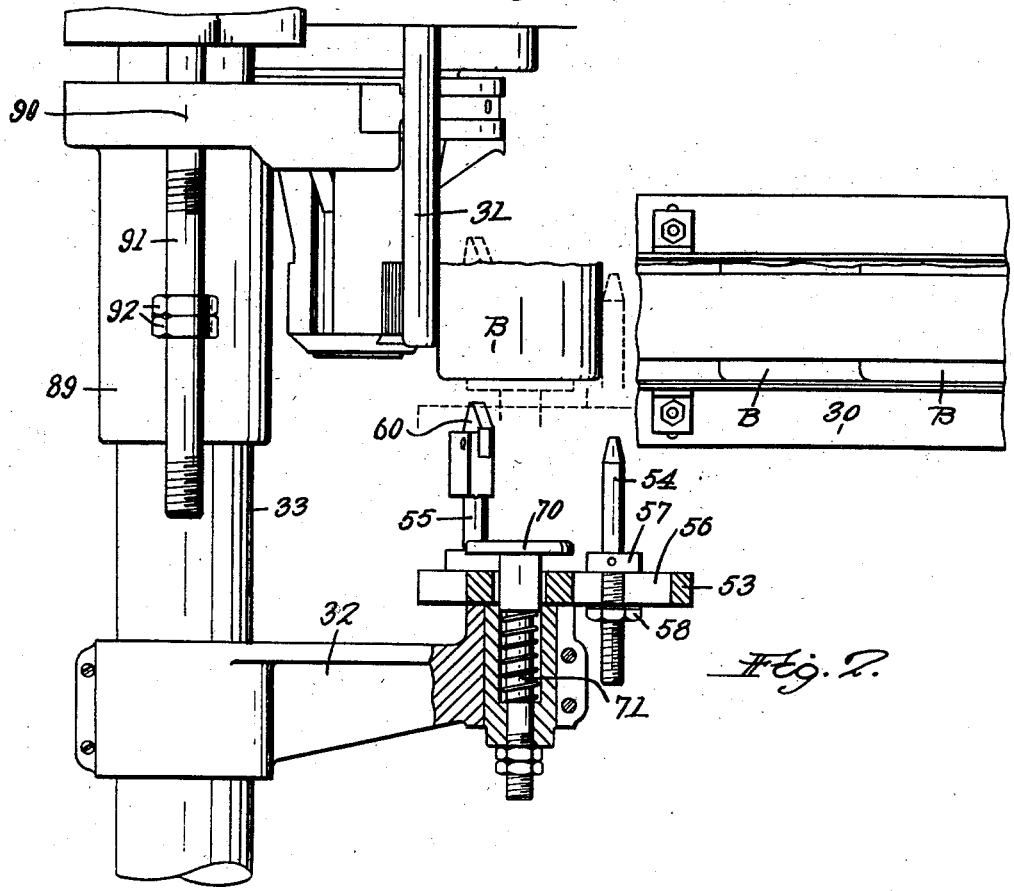

A loading arm 32 is mounted on a rock shaft 33 and is movable automatically from the full line to the dotted line position shown in Fig. 1. Provision is also made for moving the arm axially toward and away from the work when in either of the above-defined positions.

The mechanism for giving the arm 32 its angular and axial movements is best shown in Fig. 4. In order to effect angular movements, the shaft 33 is grooved to provide teeth forming a pinion 35 (Figs. 4 and 5) engaged by a rack bar 36 which is pivoted to a lever 37 (Fig. 1) mounted on a shaft or bearing 38. An arm 39 forming a part of the lever 37 is provided with a roll 40 engaging a cam 41 mounted on a drive shaft 42. The shaft 42 is given one revolution for each finishing operation of the machine and the rack 36 is thus given a complete reciprocation, swinging the arm 32 from loading position to delivery position and then back to loading position.

The shaft 33 (Fig. 4) is also provided with a grooved collar 44 engaged by rolls 45 on the upper end of a lever 46. This lever is pivoted at 47 and has a downwardly extending arm 48 provided with a roll 49 positioned in the groove 50 of a cam 51. The cam 51 is mounted on the shaft 42 previously described and rotates therewith.

During each revolution of the shaft 42, the shaft 33 and arm 32 are thus moved inward to pick up a blank, then outward and downward to a position aligned with the work holder or chuck, thereafter inward to deliver the blank to the work holder, and finally outward and upward to initial position. All of these movements are performed automatically and in timed relation to the operation of the lathe.

Work gripping devices

I will now describe the work gripping devices mounted on the arm 32. For this purpose the hub of a plate 53 (Fig. 2) is clamped in a split bearing at the end of the arm 32 and is provided with three work-engaging members. These three members comprise two threaded studs 54 and a pawl support 55. These members 54 and 55 are mounted in slots 56 (Fig. 1) in the plate 53 and are retained in adjusted position by clamping nuts 58.

Figure 3:
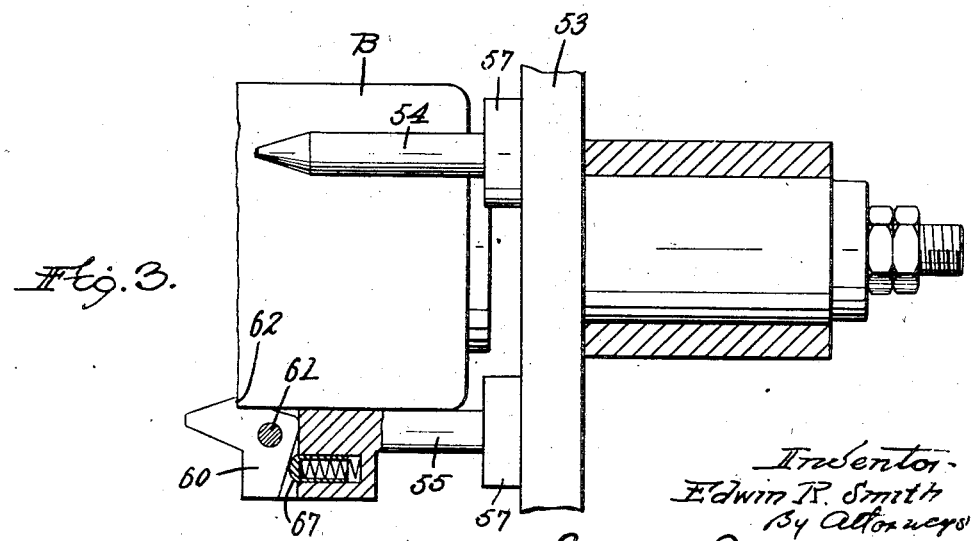

Each member 54 comprises a threaded stud (Fig. 2) held in position in the plate 53 by a collar 57 and clamping nut 58. The member 55 is provided with a latch 60 (Fig. 3) pivoted to said member 55 at 61 and having a notch or shoulder 62 adapted to engage the inner edge of the blank B. A spring plunger 67 yieldingly advances the latch towards locking position.

When the arm 32 is moved inward to pick up a blank B, the blank is centered between the members 54 and 55 and the latch 60 swings over the rear edge of the blank, thus holding the blank from axial displacement as the arm 32 is again moved outward.

A plunger 70 (Fig. 2) is slidable in the hub portion of the plate 53 and is yieldingly forced outward or toward the blank by a coil spring 71. This plunger holds the blank seated firmly against the shoulder 62 of the latch 60 and also serves as a preliminary ejector when the arm 32 starts to move away from the blank B, after placing the blank upon the work driving holder or chuck.

It will be noted that the shoulder 62 is substantially offset from its pivot 61 toward the axis of the blank. Consequently when the blank is gripped by the work driving chuck, the latch 60 will yield and slip off of the edge of the blank as the arm is moved outward to withdraw the arm from delivery position.

Inward movement of the blank relative to the work spindle is limited by engagement of the inner face of the bottom of the blank with a stop plate 73 (Figs. 6 and 7).

Unloading mechanism

Special provision is made for removing the work from the work holder or chuck after the finishing operations have been performed thereon, the finished work being indicated at W in Fig. 8.

For the purpose of removing the work, I provide a collar 80 (Figs. 6 to 9), having inwardly projecting members 81 extending into grooves 82 in the conical portion 12 of the work-holder 11.

In the drawings, I have shown three such members 81 seated in three equally spaced grooves 82 in the work-holder 11. The bottoms of these grooves 82 are below the internal cylindrical surface of the work W and the work-engaging faces 84 (Fig. 6) of the members 81 are inclined so as to form wedges or plows to engage the work W and force it off of the end of the spindle as indicated in Fig. 8. This movement of the unloading device not only displaces the finished work W, but also ejects any chips or rings R (Fig. 8) which may have accumulated on the work holder during the finishing operation.

The collar 80 is provided with a peripheral groove 86 (Fig. 6) adapted to receive a yoke member or segment plate 87 secured to a slide 88 having a hub portion 89 (Fig. 4) slidable on shaft 33 previously described.

The slide 88 also has an upwardly projecting portion 90 (Fig. 4) recessed to receive a stop rod 91 by which the ejecting movement of the unloading device may be limited. For this purpose lock nuts 92 are provided on the stop screw 91.

In order to give the unloading device an ejecting movement, I provide a cylinder 100 (Fig. 4) mounted in alignment with the shaft 33 and containing a piston 101 having a piston rod 102 slidable in an axial opening in the shaft 33. The cylinder 100 is connected by pipes 104 and 105 to a reversing valve mechanism V which may be of any usual construction.

As shown in the drawings, a supply pipe 110 leads through selective ports to branch passages 111 and 112, through which oil may be delivered to a selected one of the pipes 104 and 105. Exhaust pipes 113 and 114 also connect through suitable ports to the pipes 104 and 105. A piston valve 115 comprising four spaced piston portions is slidable in the cylinder 116 in the valve block 117 and is pivotally connected to a lever 118 (Fig. 4) rocking about a fixed pivot 119 and having a portion 120 extending into the path of dogs 121 and 122 on a drum 123, which in turn is mounted on the shaft 42 and is rotatable therewith.

As the portion 120 of the lever 118 is engaged by the dogs 121 and 122, the piston 115 is moved alternately to its two operating positions. One such position is shown in Fig. 4 in which oil under pressure from the pipe 110 is delivered through the pipe 105 to the cylinder 100 to give the unloading device an ejecting movement.

When the piston valve 115 is moved to its reverse position, oil under pressure is delivered from the pipe 110 through the pipe 104 to the right hand end of the cylinder 100, returning the unloading device to normal withdrawn and inoperative position.

The connection from the piston rod 102 (Fig. 7) to the hub 89 of the slide 88 comprises a cross-pin 130 mounted in the rod 102 and extending outward through segmental openings 131 in the shaft 33. The ends of the cross-pin 130 extend into openings in the hub 89 and impart axial movement to the slide 88 and thus to the unloading device or plow.

Having described the details of construction of my improved loading and unloading mechanism, the method of operation will be readily apparent. The unloading device normally occupies the withdrawn position indicated in Figs. 4 and 6, and the loading device occupies the full line position indicated in Fig. 1, with the lowermost blank B seated between the members 54 and 55 and held in position by the latch 60, as indicated in dotted lines in Fig. 2.

When a piece of work is finished, the arm 32 is moved outward, and the unloading device is simultaneously moved outward to remove the finished work W and the chips formed during the finishing operation.

The arm 32 then swings downward into alignment with the work holder, the unloading device returns to normal withdrawn and inoperative position, and the arm 32 moves toward the work holder to place a new blank B in position to be clamped by the expanding chuck. The chuck is then operated, gripping the work, the arm 32 is withdrawn and swung upward to initial position and is thereafter moved inward to grip another blank, placing the mechanism in position to repeat the outlined cycle of operations when another piece of work is finished.

All of the parts are of simple and substantial construction and the operation is performed quickly and positively and with very little loss of time.

Having thus described my invention and the advantages thereof, I do not wish to be limited to the details herein disclosed, otherwise than as set forth in the claims, but what I claim is:—

1. In a machine tool, a storage for blanks, a work holder, and a loading device effective to seize and transfer blanks from storage to said work holder, said loading device comprising supporting means, a plurality of work-engaging members mounted in fixed spaced relation in said supporting means and closely engaging the sides of a blank at a plurality of separated points, and a latch mounted on one of said members and engaging an edge of the blank to prevent displacement thereof.

2. In a machine tool, a rotated work holder, a loading device operable to move a blank axially to a position in which it is supported by said work holder, an ejecting device effective to remove the finished work axially from said work holder, mechanical means for moving said loading device, fluid-operated means for moving said ejecting device, a drive shaft, and control devices on said shaft for said mechanical means and for said fluid-operated means.

3. In a machine tool, a rotated work holder having axially extended grooves, means to hold an annular piece of work thereby, and means to eject the finished work therefrom, said ejecting means comprising a member having spaced fingers slidable axially in said grooves in said work holder, and actuating means for sliding said member, said member being at all times held in fixed angular relation to said work holder and being positively rotated therewith by the coaction of said spaced fingers with said grooves in said work holder.

4. In a machine tool, a rotated work holder having axially extended grooves, means to hold an annular piece of work thereby, and means to eject the finished work therefrom, said ejecting means comprising a member having spaced fingers slidable axially in said grooves in said work holder, and depressed below the work holding means, and actuating means for sliding said member, said member being at all times held in fixed angular relation to said work holder and being positively rotated therewith by the coaction of said spaced fingers with said grooves in said work holder.

5. In a machine tool, a rotated work holder having axially extended grooves, means to hold an annular piece of work thereby, and means to eject the finished work therefrom, said ejecting means comprising a member having spaced fingers slidable axially in said grooves in said work holder and depressed below the work holding means, and said member being provided with outwardly and rearwardly inclined work-engaging faces, and actuating means for said member.

6. In a machine tool, a rotated work holder having axially extended grooves, means to hold an annular piece of work thereby, and means to eject the finished work therefrom, said ejecting means comprising a member having spaced fingers slidable axially in said grooves in said work holder, and a fluid-operated cylinder and piston connected to give said member ejecting and return movements, said member being at all times held in fixed angular relation to said work holder and being positively rotated therewith by the coaction of said spaced fingers with said grooves in said work holder.

7. In a machine tool, a storage for blanks, a work holder, and a loading device effective to seize and transfer blanks from storage to said work holder, said loading device comprising supporting means, a plurality of work-engaging members mounted in fixed spaced relation in said supporting means and closely engaging the sides of the blank at a plurality of separated points, a latch pivotally mounted on one of said work-engaging members and having a hook-engagement with an edge of the blank to prevent displacement thereof, and yielding means to move said latch to operative position, said latter means yielding to release the blank as said supporting means is withdrawn after the blank is grasped by said work holder.

8. In a machine tool, a rotated work holder having an axially extended groove, an ejecting device slidable in said groove and effective to remove the finished work piece axially from said work holder, said ejecting device having an outwardly and rearwardly inclined wedge-shaped work-engaging portion, and means to move said ejecting device axially of said work holder, said ejecting device being at all times held in fixed angular relation to said work holder and being positively rotated therewith by the coaction of the work-engaging portion of said ejecting device with said groove in said work holder.

9. In a machine tool, a rotated work holder having an axially extended groove, an ejecting device slidable in said groove and effective to remove the finished work piece axially from said work holder, said ejecting device having an outwardly and rearwardly inclined wedge-shaped work-engaging portion, with a part thereof adapted to engage under and remove annular portions of waste material from said work holder, and means to move said ejecting device axially of said work holder, said ejecting device being at all times, held in fixed angular relation to said work holder and being positively rotated therewith by the coaction of the work-engaging portion of said ejecting device with said groove in said work holder.

EDWIN R. SMITH.